(12) United States Patent
Taylor

(10) Patent No.: US 8,973,539 B2
(45) Date of Patent: *Mar. 10, 2015

(54) FULL EXPANSION INTERNAL COMBUSTION ENGINE

(71) Applicant: Jack R. Taylor, Maineville, OH (US)

(72) Inventor: Jack R. Taylor, Maineville, OH (US)

( * ) Notice: Subject to any disclaimer, the term of this patent is extended or adjusted under 35 U.S.C. 154(b) by 185 days.

This patent is subject to a terminal disclaimer.

(21) Appl. No.: 13/827,220

(22) Filed: Mar. 14, 2013

(65) Prior Publication Data

US 2014/0060466 A1    Mar. 6, 2014

Related U.S. Application Data

(63) Continuation-in-part of application No. 13/323,976, filed on Dec. 13, 2011, now Pat. No. 8,550,042.

(60) Provisional application No. 61/542,541, filed on Oct. 3, 2011, provisional application No. 61/422,711, filed on Dec. 14, 2010.

(51) Int. Cl.
| | |
|---|---|
| *F02B 25/00* | (2006.01) |
| *F02B 33/04* | (2006.01) |
| *F02B 25/04* | (2006.01) |
| *F02B 31/04* | (2006.01) |

(52) U.S. Cl.
CPC .............. *F02B 33/04* (2013.01); *F02B 25/04* (2013.01); *F02B 31/04* (2013.01); *Y02T 10/146* (2013.01)
USPC .................................. 123/65 VC; 123/65 W

(58) Field of Classification Search
USPC .............................. 123/65 VC, 65 W, 65 WA
See application file for complete search history.

(56) References Cited

U.S. PATENT DOCUMENTS

| | | | |
|---|---|---|---|
| 1,233,621 A | 7/1917 | Twombly | |
| 1,601,274 A | * 9/1926 | Warrington | ............... 123/65 VC |
| 1,649,554 A | 11/1927 | Sweet | |
| 1,734,459 A | 11/1929 | Curtis | |
| 1,819,097 A | 8/1931 | Highfield | |
| 1,855,651 A | 4/1932 | Fedden | |
| 1,972,805 A | 9/1934 | Vanni | |
| 1,995,579 A | 3/1935 | Ricardo | |
| 2,018,848 A | 10/1935 | Gruebler | |

(Continued)

OTHER PUBLICATIONS

PCT International Search Report (ISR) and Written Opinion, dated Jul. 27, 2012, of related PCT Application PCT/US2011/064538 (8 pages).

(Continued)

*Primary Examiner* — Noah Kamen
(74) *Attorney, Agent, or Firm* — Hasse & Nesbitt LLC; Daniel F. Nesbitt

(57) ABSTRACT

A two-stroke, uniflow, full expansion internal combustion (IC) engine including a plurality of cylinders, including a cylinder wall and a cylinder head having an exhaust port, an exhaust valve disposed in the exhaust port, a fuel injector and a spark means disposed through the cylinder head, a piston mounted in the cylinder for reciprocal movement between a top dead center (TDC) position and a bottom dead center (BDC) position, and through a compression stroke and a power stroke, and a swirl inlet port passing through the cylinder wall at the bottom of the cylinder, wherein the swirl inlet port is covered and uncovered in response to the reciprocal movement of the piston. The exhaust port is held in an open position for a portion of the compression stroke movement of the piston, to provide a delay in the onset of the compression phase of the cylinder cycle.

11 Claims, 13 Drawing Sheets

(56) References Cited

U.S. PATENT DOCUMENTS

| | | |
|---|---|---|
| 2,058,350 A | 10/1936 | Petter |
| 2,063,374 A | 12/1936 | Hansen et al. |
| 2,123,065 A | 7/1938 | Sass |
| 2,231,392 A | 2/1941 | McCarthy |
| 2,236,950 A | 4/1941 | Ricardo |
| 2,269,084 A | 1/1942 | McCarthy |
| 2,318,333 A | 5/1943 | Ricardo |
| 2,483,288 A | 9/1949 | Malin |
| 2,552,006 A | 5/1951 | Gill, Jr. |
| 2,638,876 A | 5/1953 | Dunning |
| 2,691,968 A | 10/1954 | Barber |
| 2,699,765 A | 1/1955 | Taylor |
| 2,924,069 A | 2/1960 | Buchi |
| 2,979,045 A | 4/1961 | Busch |
| 2,991,616 A | 7/1961 | Miller |
| 3,003,485 A | 10/1961 | Chard |
| 3,309,865 A | 3/1967 | Kauffmann et al. |
| 3,494,335 A | 2/1970 | Meier |
| 3,572,298 A * | 3/1971 | Onishi et al. .................. 123/301 |
| 4,069,794 A | 1/1978 | Jordan |
| 4,088,098 A | 5/1978 | Rose et al. |
| 4,207,843 A | 6/1980 | List et al. |
| 4,359,027 A | 11/1982 | Scharpf |
| 4,491,096 A | 1/1985 | Noguchi et al. |
| 4,574,754 A | 3/1986 | Rhoades, Jr. |
| 4,625,693 A | 12/1986 | Trihey |
| 4,671,218 A | 6/1987 | Weiland |
| 4,709,683 A | 12/1987 | Schatz |
| 4,739,738 A | 4/1988 | Sander et al. |
| 4,797,070 A | 1/1989 | Schatz |
| 4,822,242 A | 4/1989 | Yamazaki |
| 4,836,153 A | 6/1989 | Velencei |
| 5,072,699 A | 12/1991 | Pien |
| 5,080,081 A | 1/1992 | Kawamura |
| 5,083,533 A | 1/1992 | Richeson et al. |
| 5,115,788 A | 5/1992 | Sasaki et al. |
| 5,131,354 A | 7/1992 | Richeson |
| 5,134,976 A | 8/1992 | Towner et al. |
| 5,150,670 A | 9/1992 | Sadler |
| 5,435,283 A | 7/1995 | Zehr |
| 5,477,838 A | 12/1995 | Schlunke et al. |
| 5,517,054 A | 5/1996 | Melchior et al. |
| 5,566,650 A | 10/1996 | Kruse |
| 5,605,125 A | 2/1997 | Yaoita |
| 5,746,163 A | 5/1998 | Green |
| 5,870,982 A | 2/1999 | Strawz |
| 5,983,854 A | 11/1999 | Machida et al. |
| 6,101,989 A | 8/2000 | Green |
| 6,101,990 A | 8/2000 | Green |
| 6,474,275 B1 | 11/2002 | Drecq |
| 6,848,416 B1 | 2/2005 | Pien |
| 7,114,485 B2 | 10/2006 | Pien |
| 7,240,491 B2 | 7/2007 | Olsson et al. |
| 7,243,641 B2 | 7/2007 | Zukouski |
| 7,395,668 B2 | 7/2008 | Gobert et al. |
| 7,469,664 B2 | 12/2008 | Hofbauer et al. |
| 7,581,526 B2 | 9/2009 | Lehmann |
| 7,721,704 B2 | 5/2010 | Lehmann |
| 8,051,830 B2 | 11/2011 | Taylor |
| 2003/0121496 A1 * | 7/2003 | Matte ........................... 123/331 |
| 2009/0064975 A1 | 3/2009 | Hedman |
| 2012/0096853 A1 | 4/2012 | Taylor |
| 2012/0174881 A1 | 7/2012 | Taylor |

OTHER PUBLICATIONS

Rotax 80-HP Rotax 912 Aircraft Engine (2 pages), printed Mar. 21, 2011. (http://www.zenithair.com/pdf-doc/912u1-80hp.pdf).

Rotax 912UL DCDI 81H (2 pages), printed Nov. 8, 2010. (http://www.rotaxservice.com/rotax_engines/rotax_912ULsp.htm).

Taylor, Charles Fayette; The Internal-Combustion Engine in Theory and Practice; The M.I.T. Press, vol. II: Combustions, Fuels, Materials, Design (Revised Edition); Chapter 2: Combustion in Spark-Ignition Engines II, Detonation and Preignition; and Chapter 3: Combustion in Diesel Engines; First paperback edition, 1977; Revised Edition, 1985, pp. 34-117 (cover + preface + chapters 2 & 3; 45 pages total).

Thomsom, John C.; Exhaust Emissions from a Turbocharged Texaco Combustion Process (TCP) Stratified Charge Engine; EPA-AA-TEB 70-2; Division of Motor Vehicle Pollution Control, National Air Pollution Control Administration, Department of Health, Education, & Welfare; Apr. 1970, pp. 1-8 (cover page + article; 9 pages total).

Hooker, Ralph J.; A Gas-Generator Turbocompound Engine; ORION, vol. 65, 1957, pp. 293-330 (38 pages).

* cited by examiner

FULL EXPANSION INTERNAL COMBUSTION ENGINE

CROSS-REFERENCE TO RELATED APPLICATIONS

This application is a continuation-in part of U.S. application Ser. No. 13/323,976, filed Dec. 13, 2011, which claims the benefit of U.S. provisional patent application 61/422,711, filed Dec. 14, 2010, and of U.S. provisional patent application 61/542,541, filed Oct. 3, 2011, the disclosures of which are incorporated by reference in their entirety.

FIELD OF THE INVENTION

The present invention relates to internal combustion (IC) engines.

BACKGROUND OF THE INVENTION

In a conventional Otto cycle internal combustion (IC) engine, the gasoline fuel is injected into the intake manifold to mix with the air and is drawn into the cylinder through the intake valve during the intake stroke. The airflow and engine power output is controlled by an air flow valve that is closed down as the engine power is reduced, which causes high pressure losses in the intake manifold, especially at low power conditions. The fuel flow is metered to produce fuel-air ratios that are very close to stoichiometric for all operating conditions. Without the high turbulence levels that can be generated by swirl flow, the mixture is not perfect and the exhaust will contain some undesirable unburned hydrocarbon and carbon monoxide emissions. The high flame temperatures generated by the stoichiometric fuel-air ratios at all operating conditions also cause high levels of nitrogen oxide emissions and high heat transfer losses from the cylinder. Also, the compression ratio of the conventional Otto cycle IC engine and the associated engine efficiency is limited by the onset of detonation and pre-ignition which can cause severe damage to the engine. To prevent overheating of the cylinders and piston seizure in this gasoline engine, caused by the high temperatures, an elaborate cooling system is required with high levels of heat energy losses. Typical conventional four-stroke Otto cycle engines with water cooling passages cast into the engine crankcase and into the cylinder head are very heavy and costly.

A diesel engine (also known as a compression-ignition engine) is an internal combustion engine that uses the heat of compression to initiate ignition to burn the fuel, which is injected into the combustion chamber. This is in contrast to spark-ignition engines such as a petrol or gasoline engine or gas engine (that uses a gaseous fuel as opposed to gasoline), which use a spark plug to ignite an air-fuel mixture.

The diesel engine has the highest thermal efficiency of any regular internal or external combustion engine due to its very high compression ratio. Low-speed Diesel engines (as used in ships and other applications where overall engine weight is relatively unimportant) often have a thermal efficiency which exceeds 50 percent.

Diesel engines are manufactured in two stroke and four stroke versions. They have been used in submarines and ships, locomotives, trucks, heavy equipment and electric generating plants, and eventually in automobiles, on-road and off-road vehicles.

The diesel internal combustion engine differs from the gasoline powered Otto cycle by using highly compressed hot air to ignite the fuel rather than using a spark plug (compression ignition rather than spark ignition). In the true diesel engine, only air is initially introduced into the combustion chamber. The air is then compressed with a compression ratio typically between 15:1 and 22:1 resulting in 40-bar (4.0 MPa; 580 psi) pressure compared to 8 to 14 bars (0.80 to 1.4 MPa; about 200 psi) in the gasoline/petrol engine. This high compression heats the air to 550° C. (1,022° F.). At about the top of the compression stroke, fuel is injected directly into the compressed air in the combustion chamber. This may be into a (typically toroidal) void in the top of the piston or a pre-chamber, depending upon the design of the engine. The fuel injector ensures that the fuel is broken down into small droplets, and that the fuel is distributed evenly. The heat of the compressed air vaporizes fuel from the surface of the droplets. The vapor is then ignited by the heat from the compressed air in the combustion chamber, the droplets continue to vaporize from their surfaces and burn, getting smaller, until all the fuel in the droplets has been burnt. The start of vaporization causes a delay period during ignition and the characteristic diesel "knocking" sound as the vapor reaches ignition temperature and causes an abrupt increase in pressure above the piston. The rapid expansion of combustion gases then drives the piston downward, supplying power to the crankshaft.

The high compression ratio of the diesel engine greatly increases the engine's efficiency without a separate ignition system. Increasing the compression ratio in a spark-ignition engine where fuel and air are mixed before entry to the cylinder is limited by the need to prevent damaging pre-ignition. In a true Diesel engine, premature detonation is not an issue because only air is compressed in a diesel engine, and fuel is not introduced into the cylinder until shortly before top dead centre (TDC), and compression ratios are much higher.

Diesel engines in service today use mechanical pumps for injecting fuel at extreme pressures directly to the combustion chamber through pressure-activated injectors, without compressed air. Such fuel injectors typically have 4 to 12 small orifices in its nozzle. The early air injection diesels always had a superior combustion without the sharp increase in pressure during combustion. Air injection-aided spraying can improve dispersion and reduce droplet size.

Diesel engines employ a mechanical or electronic governor that regulates the idling speed and maximum speed of the engine by controlling the rate of fuel delivery. Unlike Otto-cycle engines, incoming air is not throttled and a diesel engine without a governor cannot have a stable idling speed and can easily overspeed, resulting in its destruction. Mechanically-governed fuel injection systems are driven by the engine's gear train. These systems use a combination of springs and weights to control fuel delivery relative to both load and speed. Modern electronically controlled diesel engines control fuel delivery by use of an electronic control module (ECM) or electronic control unit (ECU). The ECM/ECU receives an engine speed signal, as well as other operating parameters such as intake manifold pressure and fuel temperature, from a sensor and controls the amount of fuel and start of injection timing through actuators to maximize power and efficiency and minimize emissions. Controlling the timing of the start of injection (SOI) of fuel into the cylinder can minimize emissions, and improve fuel economy (efficiency) of the engine. The timing is measured in degrees of crank angle of the piston before top dead center. For example, if the ECM/ECU initiates fuel injection when the piston is 10 degrees before TDC, the start of injection, or timing, is said to be 10° BTDC. Optimal timing will depend on the engine design as well as its speed and load.

Advancing the start of injection (injecting before the piston reaches to its SOI-TDC) results in higher in-cylinder pressure and temperature, and higher efficiency, but also results in elevated engine noise and increased oxides of nitrogen ($NO_x$) emissions due to higher combustion temperatures. Delaying start of injection causes incomplete combustion, reduced fuel efficiency and an increase in exhaust smoke, containing a considerable amount of particulate matter and unburned hydrocarbons.

Present day diesel engines use a camshaft (rotating at half crankshaft speed) lifted, mechanical single plunger with a high pressure fuel pump (driven by the engine crankshaft). For each cylinder, the plunger measures the amount of fuel and determines the timing of each injection. These engines use injectors that are very precise spring-loaded valves that open and close at a specific fuel pressure. For each cylinder a plunger pump is connected to an injector with a high pressure fuel line. Fuel volume for each single combustion is controlled by a slanted groove in the plunger which rotates only a few degrees releasing the pressure, and is controlled by a mechanical governor, consisting of weights rotating at engine speed constrained by springs and a lever. The injectors are held open by the fuel pressure. On high speed engines the plunger pumps are together in one unit. Each fuel line should have the same length to obtain the same pressure delay.

A less complex configuration on high speed engines with fewer than six cylinders is to use an axial-piston distributor pump, consisting of one rotating pump plunger delivering fuel to a valve and line for each cylinder (functionally analogous to points and distributor cap on an gasoline engine). Another method uses a single fuel pump which supplies fuel to each injector constantly at high pressure with a common rail (single fuel line common). Each injector has a solenoid operated by an electronic control unit, resulting in more accurate control of injector opening times that depend on other control conditions, such as engine speed and loading, and providing better engine performance and fuel economy. This design is also mechanically simpler than the combined pump and valve design, making it generally more reliable, and less loud, than its mechanical counterpart.

Modern diesel engines make use a direct injection method. One type is a direct injection injector mounted in the top of the combustion chamber, with electronic control of the injection timing, fuel quantity, EGR and turbo boost, giving more precise control of these parameters which eased refinement and lowered emissions. Unit direct injection injects fuel directly into the cylinder of the engine, combining the injector and the pump into one unit positioned over each cylinder controlled by the camshaft. Each cylinder has its own unit eliminating the high pressure fuel lines, achieving a more consistent injection.

In a two-stroke diesel engine, as the cylinder's piston approaches the bottom dead center, exhaust ports or valves are opened, relieving most of the excess pressure after which a passage between the inlet air box and the cylinder is opened, permitting air flow into the cylinder. The air flow blows the remaining combustion gases from the cylinder—this is the scavenging process. As the piston passes through bottom center and starts upward, the passage is closed and compression commences, culminating in fuel injection and ignition.

Diesels are now turbocharged, and some are both turbo charged and supercharged. Because diesels do not have fuel in the cylinder before combustion is initiated, more than one bar (100 kPa) of air can be loaded in the cylinder without preignition. A turbocharged engine can produce significantly more power than a naturally aspirated engine of the same configuration, as having more air in the cylinders allows more fuel to be burned and thus more power to be produced. A supercharger is powered mechanically by the engine's crankshaft, while a turbocharger is powered by the engine exhaust, not requiring any mechanical power. Turbocharging can improve the fuel economy of diesel engines by recovering waste heat from the exhaust, increasing the excess air factor, and increasing the ratio of engine output to friction losses.

A two-stroke engine does not have a discrete exhaust and intake stroke and thus is incapable of self-aspiration. Therefore all two-stroke engines are fitted with a blower or compressor to charge the cylinders with air and assist in dispersing exhaust gases from the cylinder, a process referred to as scavenging. In some cases, the engine may also be fitted with a turbocharger, whose output is directed into the blower inlet. A few designs employ a hybrid turbocharger for scavenging and charging the cylinders, which device is mechanically driven at cranking and low speeds to act as a blower.

A stratified charge engine is a type of internal-combustion engine, similar in some ways to the Diesel cycle, but running on normal gasoline. The name refers to the layering of fuel/air mixture charge inside the cylinder. In a traditional Otto cycle engine, the fuel and air are mixed outside the cylinder and the mixture is drawn into the cylinder during the intake stroke. The air/fuel ratio is kept very close to stoichiometric, which is defined as the exact amount of air necessary for a complete combustion of the fuel. This mixture is easily ignited and burns smoothly. The problem with this design is that after the combustion process is complete, the resulting exhaust stream contains a considerable amount of free single atoms of oxygen and nitrogen, the result of the heat of combustion splitting the $O_2$ and $N_2$ molecules in the air. These will readily react with each other to create nitrous oxide ($NO_x$), a pollutant. A catalytic converter in the exhaust system re-combines the $NO_x$ back into $O_2$ and $N_2$ in modern vehicles A direct injection diesel engine, on the other hand, injects diesel fuel (which is heavier and resistant to vaporization) directly into the cylinder, the combustion chamber is in the top of the piston. This has the advantage of avoiding premature spontaneous combustion—a problem known as detonation or ping that plagues the Otto cycle engines when the fuel-air mixture pre-detonates with high compression conditions—and allows the diesel to run at much higher compression ratios. This leads to a more fuel-efficient engine, which is commonly found in applications where it is being run for long periods of time, such as in trucks and industrial power plants.

However the Diesel engine has problems as well. The fuel is sprayed right into the highly compressed air and has little time to mix properly. This leads to portions of the charge remaining almost entirely air and other portions almost entirely of unburnt fuel lacking for oxygen. This incomplete combustion leads to the presence of other pollutants such as partially burnt and unburnt fuel—polycyclic aromatic hydrocarbons and the plainly visible exhaust soot. The indirect injection diesel where fuel is injected into a pre-chamber (the best known being Ricardo Consulting Engineers' Ricardo Comet design), where the flame front from the pre-chamber ignition leads to better mixing of the air and fuel, smoother combustion in the cylinder, and a reduction in diesel knock. Indirect injection diesels are a kind of stratified charge engine. These benefits came at the cost of a 10% efficiency reduction compared to direct injection diesels.

The stratified charge design attempts to fix the problems with both fuels. It uses a direct-injection system, like the diesel, with its inherent ability to be run at efficient high compressions that remain constant throughout the operation range of the engine. However, like the Otto, the stratified charge design relies on gasoline's ability to mix quickly and cleanly in order to avoid the poor combustion found in older direct injection diesels. To do this the fuel injectors are aimed to inject the fuel into only one area of the cylinder, often a small "subcylinder" at the top, or periphery, of the main cylinder, to provide a rich charge in that area that ignites easily and burns quickly and smoothly. The combustion process proceeds and moves to a very lean area (often only air) where the flame-front cools rapidly and the harmful $NO_x$ has little opportunity to form. The additional oxygen in the lean charge also combines with any CO to form $CO_2$, which is less harmful. This technology has also been applied to the latest electronically controlled direct injection diesels. The injection system on these engines delivers the fuel in multiple injection bursts to ensure better fuel/air mixing and reduced diesel knock. The much cleaner combustion in stratified charge gasoline engines allows for the elimination of the catalytic converter and allows the engine to be run at leaner (lower ratio of fuel to air) mixtures, using less fuel. It has had a similar effect on diesel engine performance. Today's diesels are cleaner and can be twice as powerful as before, while maintaining similar fuel economy.

After years of trying, this layout has proven not to be terribly easy to arrange. The system has been used for many years in slow-running industrial applications, but has generally failed to develop into an automobile engine. Many attempts have been made over the years, notably in Wankel engine applications, but only the Japanese car manufacturers have pressed ahead with piston-engine development.

A typical automotive internal combustion engine recovers only about 25% of the heat energy available in the fuel. A large amount of the energy is lost to the cooling system and another large amount of energy is released to the atmosphere through the exhaust valve at the end of the power stroke. Also, conventional engines are very heavy and very complex and costly.

U.S. Pat. Nos. 6,848,416 and 7,114,485 describe a two-stroke over expanded homogenous charge compression ignition (HCCI) engine employing inlet and exhaust valves and pre-compressed fuel-air mixture, the disclosures of which are incorporated by reference in its entirety.

U.S. Pat. No. 5,083,533 describes a two-stroke engine with variable valve timing to control the compression ratio and power output of the engine, the disclosure of which are incorporated by reference in its entirety.

There remains a very important need to provide a low cost internal combustion engine having improved fuel efficiency at all operating conditions, and low nitrogen oxide, hydrocarbon, and carbon monoxide emissions, that can operate with a variety of fuels. An engine that can reduce fuel consumption by almost one-half would greatly reduce greenhouse gas emissions and this country's dependence on oil imports.

SUMMARY OF THE INVENTION

The present invention provides a two-stroke, uniflow, full expansion cylinder and an internal combustion engine including a plurality of the two-stroke, uniflow, full expansion cylinders.

The present invention provides a cylinder for an internal combustion engine, the cylinder including a cylinder wall and a cylinder head having one or more exhaust ports, an exhaust valve disposed in the exhaust port, a fuel injector and a spark means disposed through the cylinder head, a piston mounted in the cylinder for reciprocal movement between a top dead center (TDC) position and a bottom dead center (BDC) position, and through a compression stroke and a power stroke, a swirl inlet port passing through the cylinder wall at the bottom of the cylinder, wherein the at least one swirl port is covered and uncovered at fixed closing and opening cycle timing, respectively, in response to the reciprocal movement of the piston, and an exhaust port closure mechanism to effect closing and opening of the exhaust port, at fixed closing and opening cycle timing, respectively in relation to the stroke position of the piston, the exhaust port closure mechanism configured to hold open the exhaust port for a portion of the compression stroke movement of the piston.

The present invention further provides a method for operating a two-stroke, uniflow, full expansion, internal combustion (IC) engine, the method comprising repeating a cylinder cycle, the cycle comprising the steps of: a) passing pressurized inlet air through an uncovered swirl inlet port and into the cylinder with the piston proximate the bottom of its reciprocal stroke within the cylinder, and swirling the inlet air in tangential turbulent unidirectional flow within the cylinder, b) maintaining the exhaust port in an open position while the swirl inlet port is uncovered to provide scavenging of the cylinder by the inlet air, c) advancing the piston upward to cover the inlet port at a fixed closing cycle timing, d) further maintaining the exhaust port in an open position for a substantial portion of the stroke movement of the piston toward top dead center; e) closing the exhaust port at a fixed closing cycle timing, f) compressing the inlet air between the piston and the cylinder head toward top dead center, g) dispersing a fuel near the end of the compression stroke at a lean burning fuel to air ratio, h) igniting and combusting the air-fuel mixture to initiate the power stroke, i) opening the exhaust port near the end of the power stroke at a fixed opening cycle timing to exhaust pressurized combustion gases, and j) uncovering the inlet swirl port at a fixed opening cycle timing as the piston approaches the bottom of its power stroke.

The step of further maintaining the exhaust port in an open position for a portion of the stroke movement of the piston, provides a delay in the onset of the compression phase of the cylinder cycle, and can include maintaining the exhaust port in an open position until the piston has reached a start-of-compression position within the cylinder between a inlet-seal position where the inlet air ports are fully covered, and a top-dead-center position at the top of the stroke at top dead center. The start-of-compression position of the piston is the piston position when the exhaust port closes, initiating the start of the compression of the inlets gases within the cylinder chamber. At the start of compression, the inlet air within the sealed cylinder chamber is compressed as the cylinder proceeds from the start-of-compression position to the top-dead-center position. At the end of the compression phase, with the cylinder at or near top-dead-center, the remaining void space between the piston and the cylinder head is termed the combustion chamber.

Typically, the start-of-compression position is about half the distance of the normal full compression stroke, between the inlet-seal position and the top-dead-center position, but can be somewhat more or less. The start-of-compression position is selected to provide that the pressure in the cylinder after combustion and at the end of the power stroke, just before the exhaust valve opens to exhaust combustion gases, is approaching atmospheric pressure. This minimizes the loss of energy that remains in the combustion-pressurized cylinders to the exhaust system.

An aspect the invention is the operation of the IC engine and the exhaust port closure mechanism to provide for full expansion of the piston during the power phase of the cylinder operating cycle, and for limiting the duration of the compression phase of the cylinder cycle relative to the duration of the power phase.

In an aspect of the invention, the cylinder can have a single swirl inlet port or a plurality of swirl inlet ports for directing fresh combustion air into the cylinder uniformly at a high velocity and in a swirl pattern, to provide turbulent, upward, swirling inlet air through the cylinder.

In another aspect of the invention, the cylinder provides a stream of combustible fuel into the turbulent, swirling inlet air, in the same tangential direction as the air flow, that results in a rapid, well-defined, stratified charge, intimate air-fuel mixing, a stratified-charge combustion, and very short combustion delay times. The stream of fuel can be a dispersion, spray or aerosol of liquid fuel droplets, or a stream of vaporous fuel.

In another aspect of the invention, the operation of the cylinder provides high engine compression ratios, without pre-ignition or pre-detonation. The compression ratio of the cylinder can be about 10:1 and 25:1, more typically about 15:1 to about 22:1, and for example about 20:1. The compression ratio of the cylinder is the ratio of the volume within the cylinder chamber at the start of compression to the volume of the combustion chamber.

Another aspect of the invention is an internal combustion engine with a single cylinder, with two cylinders, with three or more cylinders, with an even number of cylinders, with an odd number of engines, with the cylinders in a linear arrangement, with the cylinders in an opposed and/or horizontal arrangement, with the cylinders arranged in a V-shape, or with the cylinders in a radial arrangement.

Another aspect of the present invention, the design of the cylinder and its operation provides lean burning, direct fuel injection into and with the inlet air, employing a low fuel to air mixture ratio, which reduces the flame temperature, resulting in reduced combustion heat energy loss and reduced nitrous oxide (NOx) emissions. The lean burning fuel to air ratio is in the range of about 0.04 to about 1, more typically about 0.2 to about 0.8, for example about 0.6, but can be operated at limited periods of time at higher ratios when emergency power is demanded.

Another aspect of the present invention is the use of thermal barrier coatings (TBCs) on the inside of the cylinder head and the piston crown to further reduce combustion heat energy losses. U.S. Pat. No. 5,722,379 and International Patent Publication WO 93/13245, the disclosures of which are incorporated by reference in their entireties, disclose internal combustion engines having thermal barrier coatings on the pistons, cylinder heads and other parts of the engine and cylinder exposed to high temperatures.

Another aspect of the present invention is a two-stroke internal combustion engine that can be air cooled because of the reduction in heat energy loss through the cylinder wall, which eliminates the weight, complexity, and cost of a conventional water cooling system, that is usually cast into a heavy engine block.

Another aspect of the present invention is a two-stroke internal combustion engine without an intake air valve or port in the cylinder head and the associated mechanisms required to open and close the valve. This reduces the weight, complexity, and cost of the engine.

Another aspect of the present invention is a two-stroke uniflow full expansion internal combustion engine that uses a low pressure ratio inlet air supercharger that draws in, compresses and discharges ambient air into the air intake manifold. The low pressure ratio inlet air compressor includes a positive displacement compressor that is driven by the engine powered shaft, to provide a mass quantity of inlet air that is proportional to the engine revolution speed.

Another aspect of the invention is the ability to use lean burning with low fuel flow to control the power output of the engine. This method of control eliminates flow restrictions and pressure losses in the intake manifold.

Another aspect of this invention is that the compression ratio can be very high without pre-ignition or detonation. The high compression ratio is constant, with high cycle efficiency, throughout the operating range of the engine.

Another aspect of the present invention is the ability to use a wide variety of fuels, including gasoline including low cost, low octane fuels, diesel, alcohol, kerosene, jet-A, and biodiesel, separately, intermittently, or mixed together, with minor adjustments to the engine operating parameters.

Another aspect of the invention is the use of ceramic matrix composite (CMC) materials for making the combustion-exposed components of the IC engine, to reduce thermal losses.

The engine of the present invention can be used in a wide variety of applications, including small aircraft, unmanned aerial vehicles (UAVs), automobiles, and trucks, but also in military vehicles, helicopters, and marine vessels.

DETAILED DESCRIPTION OF THE INVENTION

Definitions

As used herein, a stratified charge means that the fuel spray from the high pressure injector has a spray pattern that is fuel rich in the center of the spray where the spark ignitor can ignite rich fuel-air ratios and very lean fuel-air ratios.

As used herein, a spark means includes a means for igniting a fuel-air mixture in a cylinder for combustion, and can include a spark plug, a flame, a heated tube, a laser, and a magneto.

As used herein, combustion delay time is defined as the time interval between the injection of the fuel and the completion of the temperature rise due to combustion of the fuel.

As used herein, scavenge efficiency is defined as the percent of fresh air in the cylinder volume when the exhaust valve closes with some of the unscavanged burned gases remaining in the cylinder.

The present invention provides a two-stroke, uniflow, full expansion cylinder(s) in an internal combustion engine that is configured to operate through a cylinder cycle that permits recovering most of the combustion (exhaust) energy by extending the power stroke of the piston. More particularly, the power stroke of the piston is extended along a length of the cylinder that is more than a length of cylinder through which the piston passes during the compression of inlet air, as a result of holding open the exhaust port in an open position for a portion of the compression stroke movement of the piston, during part of what would otherwise normally be the compression stroke phase. Notwithstanding, when the exhaust valve closes, the volume change during the compression stroke of the cylinder is configured to provide a high compression ratio. A means for increasing the compression ratio includes configuring the void space within the cylinder head to reduce the volume of the combustion chamber.

Figure 1:
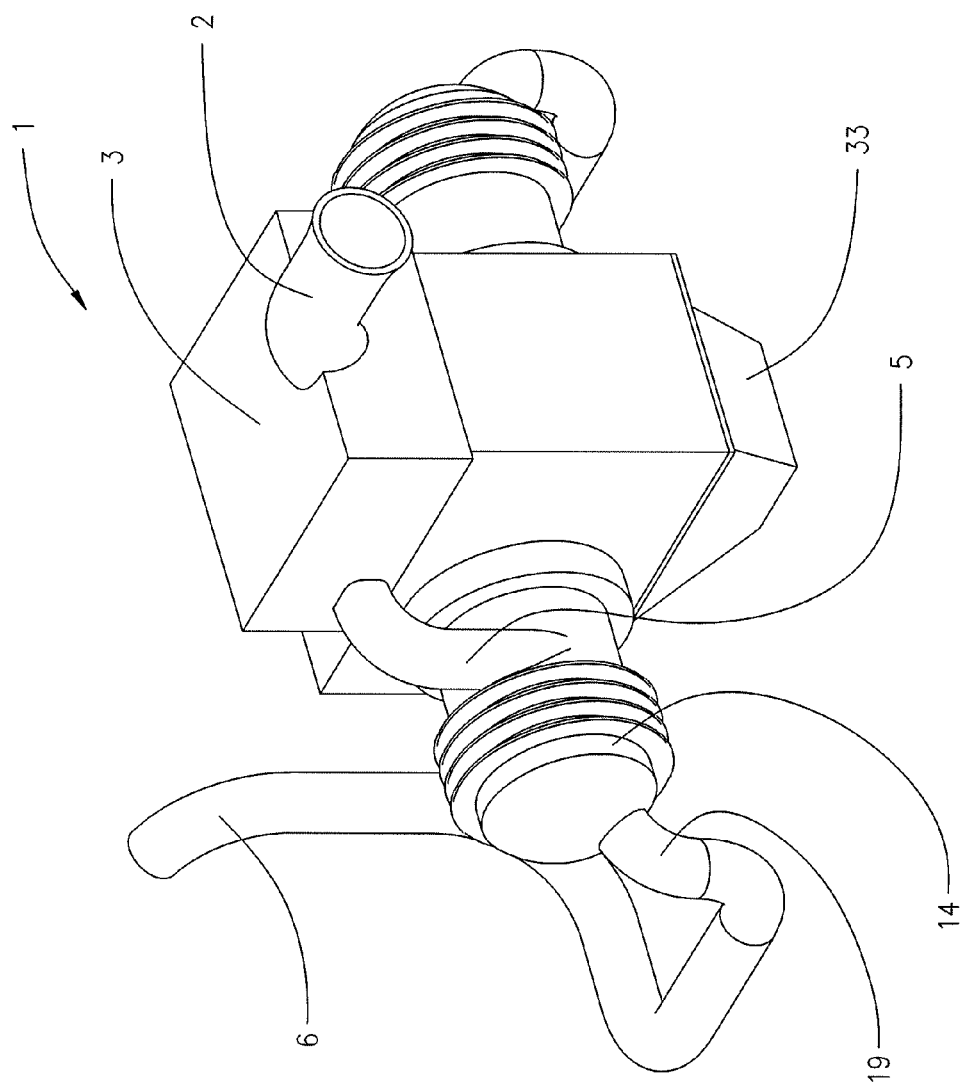
FIG. 1 shows a front perspective view of a uniflow, full expansion, internal combustion engine that includes a low pressure positive displacement compressor.
Figure 2:
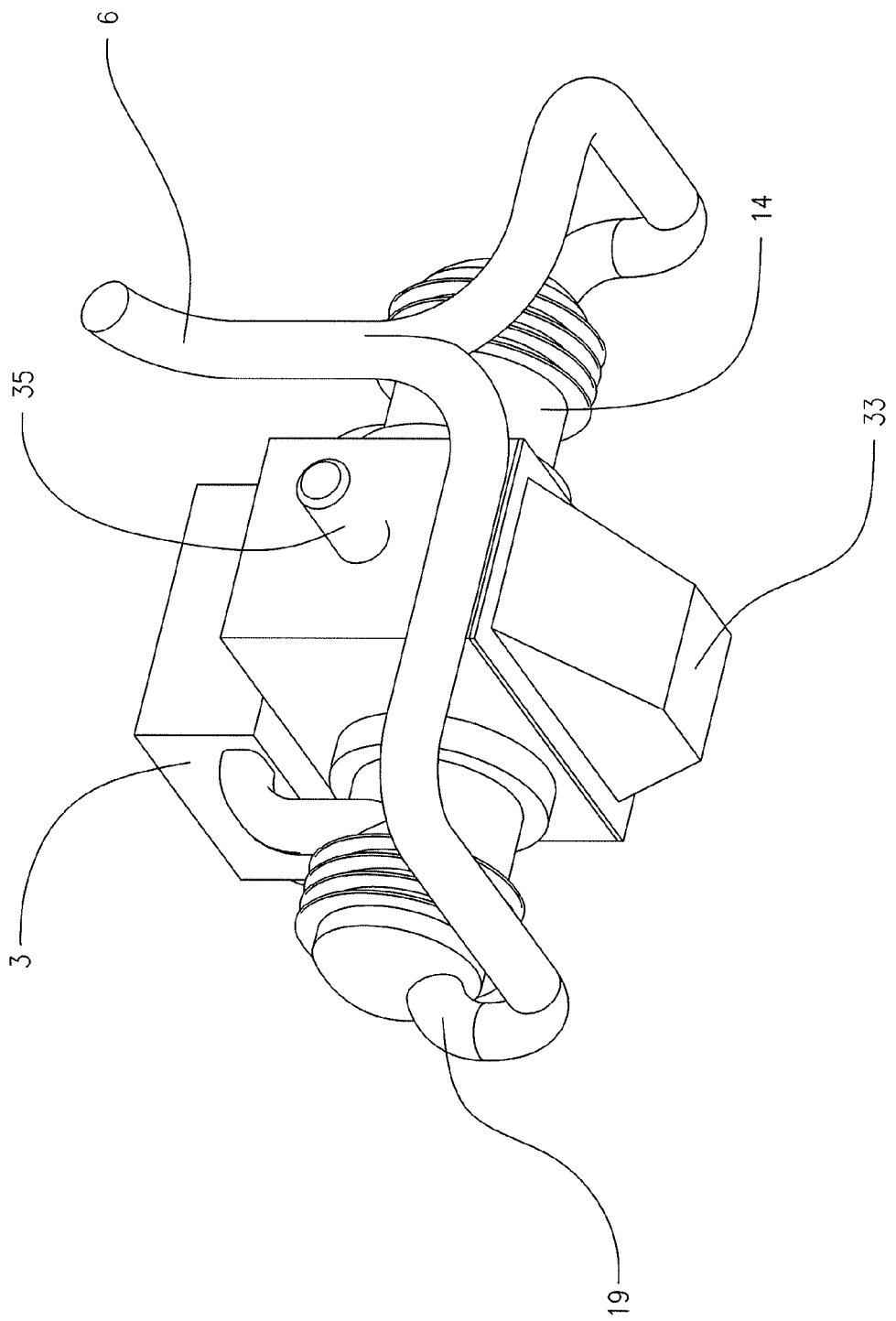
FIG. 2 shows the bottom-rear perspective view of the uniflow, full expansion, internal combustion engine of FIG. 1.
Figure 3:
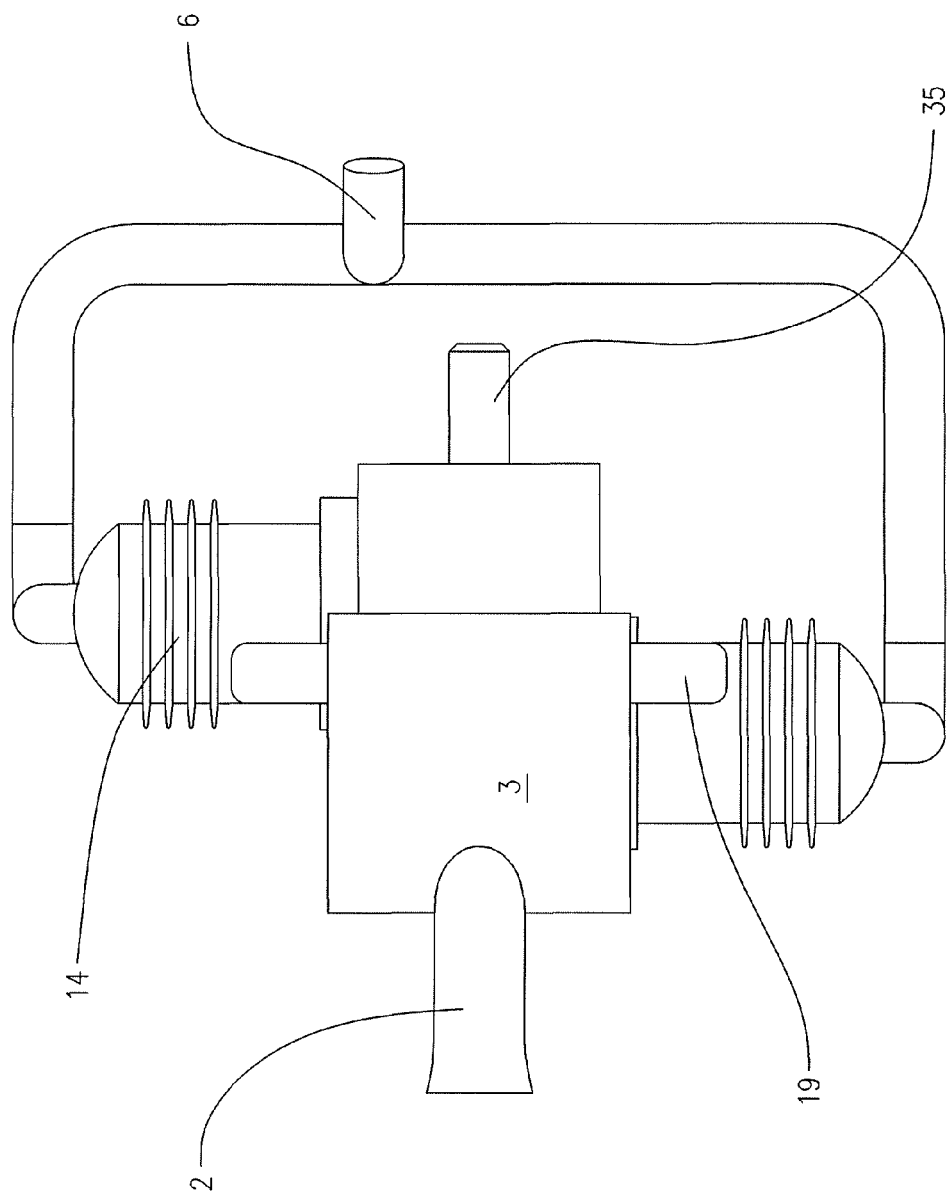
FIG. 3 shows the top plan view of the uniflow, full expansion, internal combustion engine of FIG. 1.

An embodiment of the two-stroke, uniflow, full expansion IC engine is shown in FIGS. 1-3, illustrated as a horizontally-opposed, air-cooled two-cylinder engine 1. While a conventional vehicle usually employs a four-cylinder, four-stroke engine, an engine of the present invention that employs two, two-stroke cylinders, with the cylinders being slightly larger in diameter to account for the reduced length of the compression stroke relative to the power stroke, provide comparable power. A low pressure ratio supercharger 3 that is geared to the engine crankshaft 35 draws ambient inlet air through an air intake pipe 2 and discharges the air into the cylinder air intake pipes 5. An optional air cooler can be employed. The low pressure ratio supercharger provides a compression ratio (outlet:inlet) of up to 4:1, more typically up to about 3:1, and can be for example about 2:1 or 1.5:1. An example of a low pressure supercharger is a Lysholm twin-screw supercharger, available from Vortech Engineering. Each cylinder 14 of the engine includes a tangential air inlet port 8 located near the bottom of the cylinder. The piston 9 reciprocates within the cylinder 14 in a fixed cycle, wherein the piston 9 covers and uncovers the air inlet port 8 at fixed closing and opening cycle timing, respectively. Exhaust gases exit the cylinders 14 through the exhaust valves 20 at the top of the cylinder in the cylinder head 16, and then through the engine exhaust outlet ducts 19. A crankcase houses the crankshaft 35 and includes a depending oil pan 33. The full expansion engine of the invention is more efficient, lighter in weight, smaller in size, and less costly than a conventional, comparably-powered internal combustion engine. Fuel consumption is expected to be at least about 35-40% less than that of a conventional engine, and at least about 50% less than that of a conventional loop scavenged two-stroke engine, all other conditions being equal.

Figure 4:
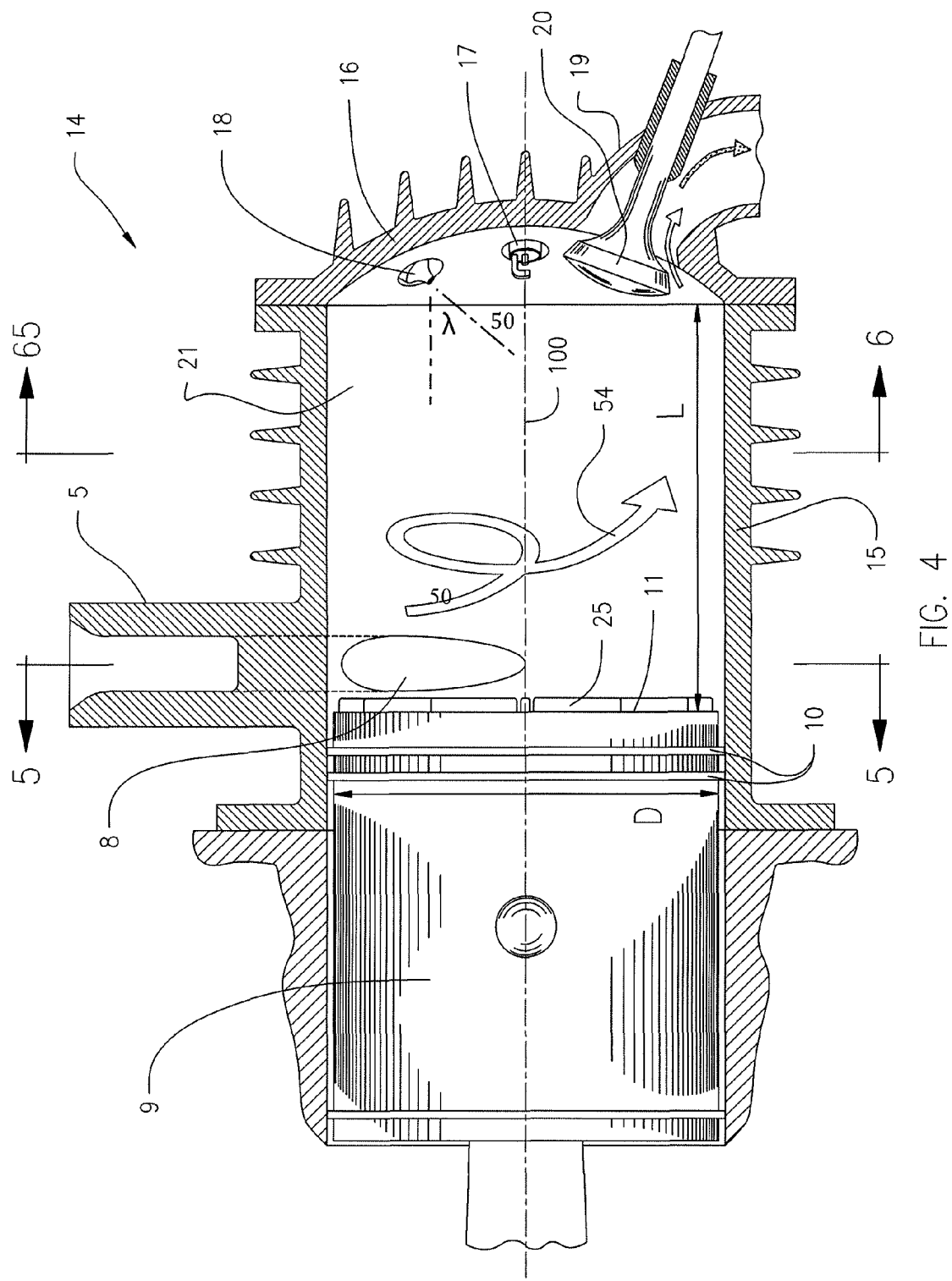
FIG. 4 shows a vertical sectional view of the uniflow, full expansion engine cylinder in an air intake and scavenging condition.
Figure 5:
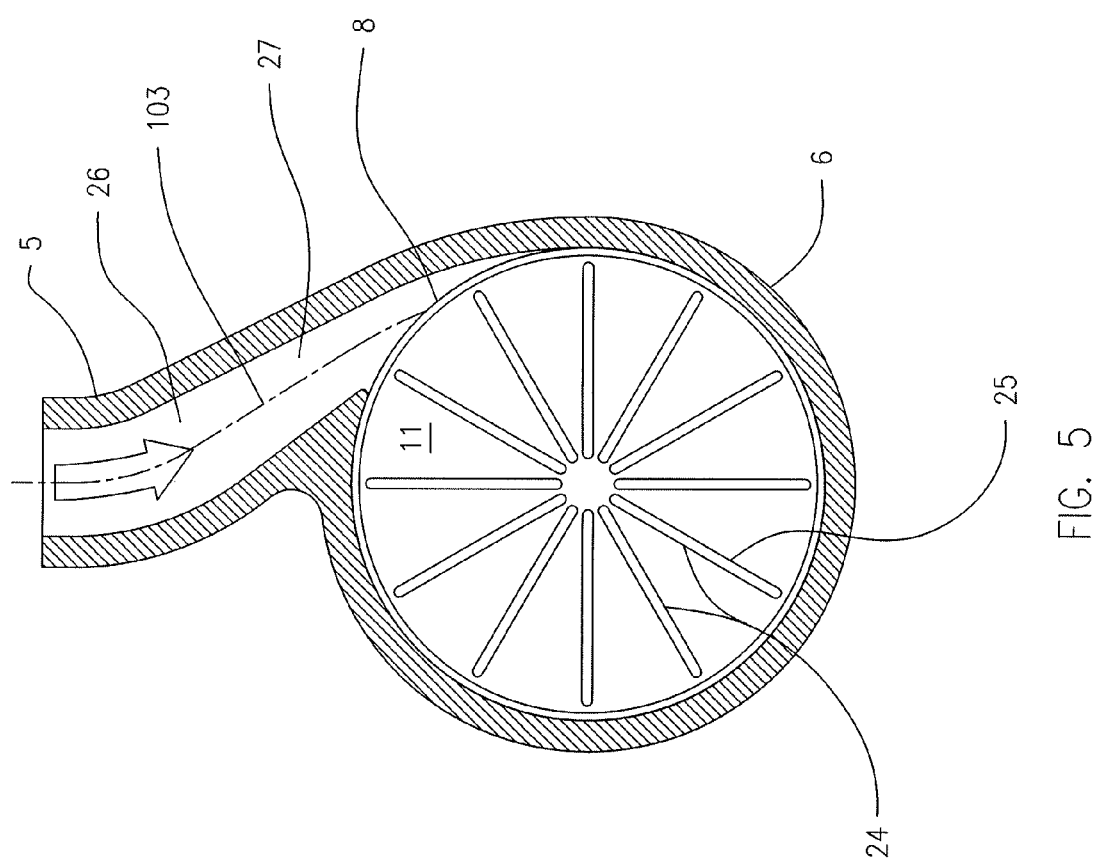
FIG. 5 shows a horizontal sectional view of the cylinder through line 5-5 of FIG. 4.
Figure 9:
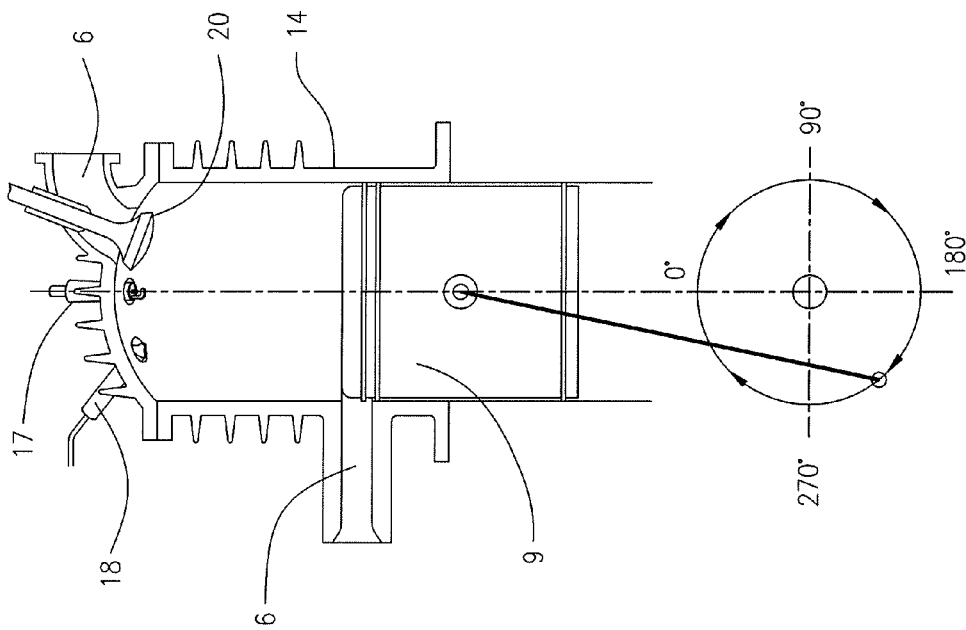
FIG. 9 shows a schematic diagram of the uniflow cylinder showing the crank angle position with the piston closing the inlet air swirl port, with the exhaust port remaining open.

A schematic of the mechanical elements of one of the cylinders is shown in FIG. 4. Fuel is injected through cylinder head 16 by a fuel injector 18, and a spark means 17 provides ignition of the fuel. FIGS. 4 and 5 show the vertical sectional view and a horizontal sectional view, respectively, through one of the cylinders 14 of the engine 1. The cylinder 14 includes a cylindrical wall 15 that defines a variable-volume cylinder chamber 21 between a piston 9 and a cylinder head 16, and has exterior surface cooling fins. Disposed in the cylinder head 16 are the high energy sparkplug 17 and the fuel injector 18. An exhaust valve 20 operates axially between an open position as shown in FIG. 4 with the exhaust valve 20 lifted off the exhaust port seat, and a closed position as shown in FIG. 9 with the valve seated, to provide fluid communication between the cylinder chamber 21 and the exhaust port 19 and an exhaust outlet duct 6. The piston 9 of diameter D reciprocates within the cylinder 5 through a stroke length L, to define the volumetric displacement of the cylinder chamber. The piston 9 drives the crank shaft 35 (FIG. 2) through a connecting rod and crank arm/pin (not shown, by well-known means).

Figure 7:
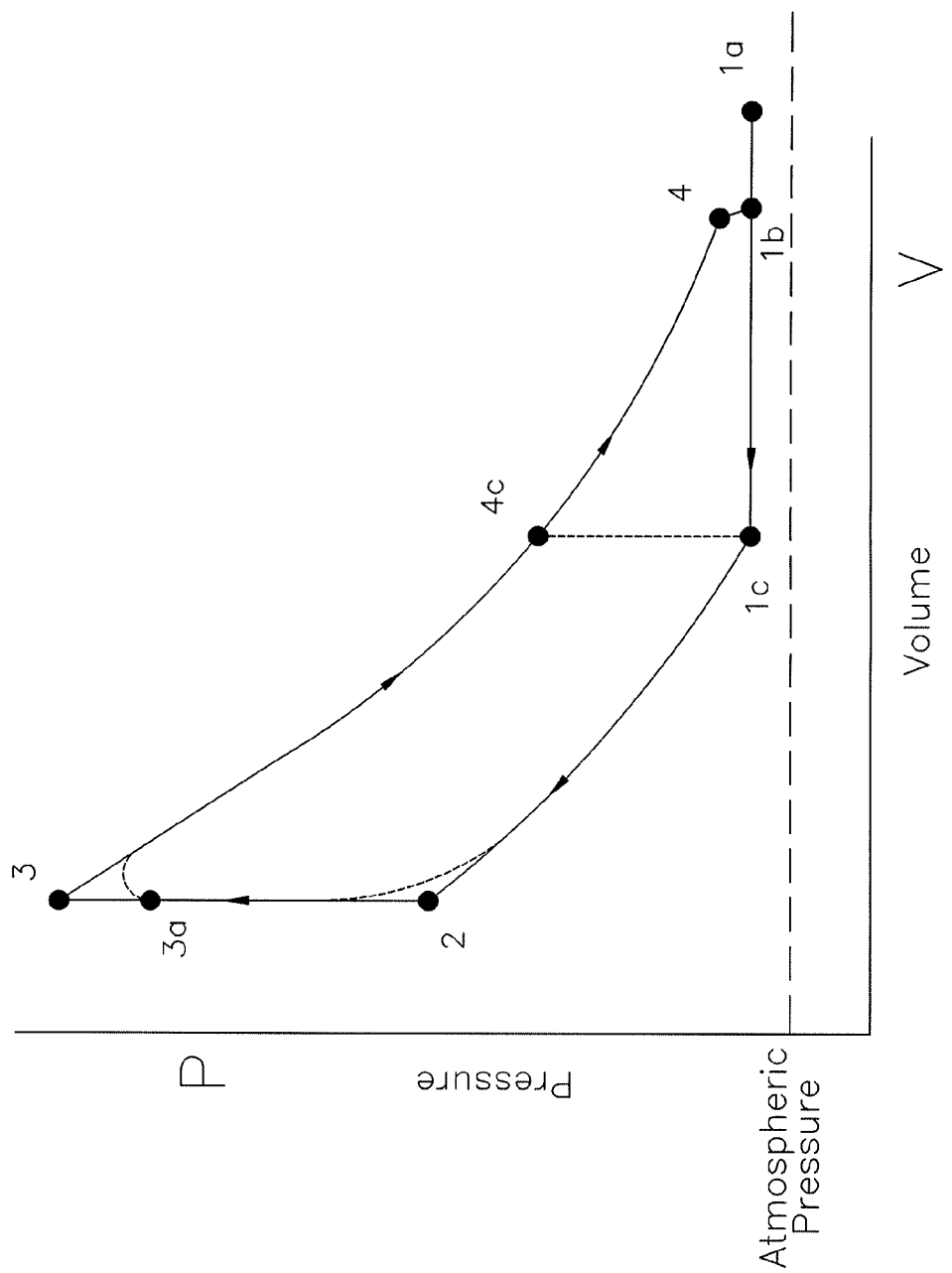
FIG. 7 shows a pressure-volume diagram for the thermodynamic cycle of the full expansion cylinder of the present invention.

The ratio of L:D is typically about 1.0 or slightly less, or slightly more. However, for the full expansion engine of this invention, this ratio may also be somewhat larger, typically up to about 1.3:1 to 1.4:1, to accommodate the increased power stroke length (FIG. 7, cycle points 3 to 4) relative to the reduced length of the compression stroke (FIG. 7, cycle points 1c to 2).

As shown in FIGS. 4 and 5, each piston 9 includes a piston top 11 and piston rings 10 disposed within annular grooves in the sidewall of the piston 9. The top 11 of the piston includes a plurality of auxiliary vanes 24 oriented in a radial direction from the center of the piston, and transverse to the direction of the single swirl port 8 (or plurality of swirl ports) to increase the turbulence of the scavenging air that swirls upward within the cylinder chamber 21. The number of auxiliary vanes can be the same as or different from the number of swirl ports 8, when a plurality are used, though typically number from 8-12, equally spaced. The auxiliary vanes have elongates side walls 25 extending axially from, and radially to proximate the edge of, the piston top 11, to help generate turbulence for air-fuel mixing.

FIG. 5 shows the air inlet swirl port 27 oriented tangential to the inside surface of the wall 15 of the cylinder 14. The centerline 103 of the inlet port 5 can be curved to some degree as shown in FIG. 5, or it can be straight. The cross-sectional area of the swirl port 8 is typically smaller than the cross-sectional area of the inlet port 5, to increase the velocity of the air entering the cylinder chamber 21. A typical average velocity of the air entering the cylinder is about 500 feet per second, with a pressure drop of about 4% of the total pressure of the inlet air. An increase in the swirl velocity ratio, defined as the ratio of the swirl velocity to the average upward air velocity through the cylinder, has been shown from experimental data to correlate with a significant increase in the maximum cylinder pressure (FIG. 7, cycle point 3) achieved in a uniflow scavenged cylinder design, which can result in an increase in engine efficiency. FIG. 5 also shows the small radial ridges 24 on the top of the piston 9. These ridges, which are perpendicular to the air swirl direction, generate high intensity small scale turbulence that improves the mixing of the injected fuel and swirling air, and reduces the combustion delay time.

In an alternative embodiment, air inlet can include a scroll plenum extending unidirectionally around the outside of the cylinder wall and having an inlet and a plurality of swirl ports disposed through the cylinder wall and entering the cylinder chamber tangentially with respect to the axial centerline of the cylinder, as described in U.S. Pat. No. 8,051,830, the disclosure of which is incorporated by reference in its entirety. The design and sizing of the swirl port or plurality of swirl ports can be specified for a particular engine design and fuel source using computational fluid dynamics (CFD). The number of swirl ports 8 and corresponding inlet vanes 7 can number up to hundreds, and more typically numbers between about 12 and 48. The high velocity, tangential swirl port(s) help to provide a very short combustion delay time, and a higher mean effective pressure (MEP) in the cylinder, and increased engine efficiency.

The fuel injector 18 injects the fuel directly into the cylinder along a vector path 50 into a spray pattern 56, at an angle lambda ($\lambda$) from vertical (which is a line oriented parallel to the centerline 100), typically about at least 60° and up to 80°, and along a tangential pathway 52 and downstream with the highly turbulent, swirling airflow 54, providing a stratified fuel charge, and lean burning down to very low fuel-air ratios. In an aspect of the invention, a lean burning air-fuel mixture is provided to improve fuel efficiency and power generation, through more efficient lean burning of the fuel, and through improved thermal efficiency. Typically, the benefits of leaner burning of fuel include improved fuel efficiency, lower emissions and reduced heat losses. The theoretical lean mixture can be as low as 0.04. A preferred range for lean burning is about 0.2 to about 0.8, including 0.3, 0.4, 0.5 0.6 and 0.7.

To inject fuel at the high pressures of the combustion chamber, a typically fuel injector is provided with fuel at a pressure of about 4000 psi. An example of a fuel injector includes a device described in one of U.S. Pat. No. 5,392,745 and U.S. Pat. No. 6,349,706, the disclosures of which are incorporated by reference herein in their entirety.

The IC engine of the present invention can employ an electronic control module (ECM) or electronic control unit (ECU) to control the timing and quantity of fuel delivery, relative to the amount (mass) of inlet air within the cylinder chamber, to achieve lean burning. The ECM/ECU receives an engine speed signal, as well as other operating parameters such as intake manifold pressure and fuel temperature, from a sensor and controls the amount of fuel and start of injection timing through actuators to maximize power and efficiency and minimize emissions.

The full expansion engine of the invention also differs from typical two-stroke engines by providing pressure lubrication with an oil sump, an oil pump, an oil filter, and the typical oil passages throughout the engine.

Figure 6:
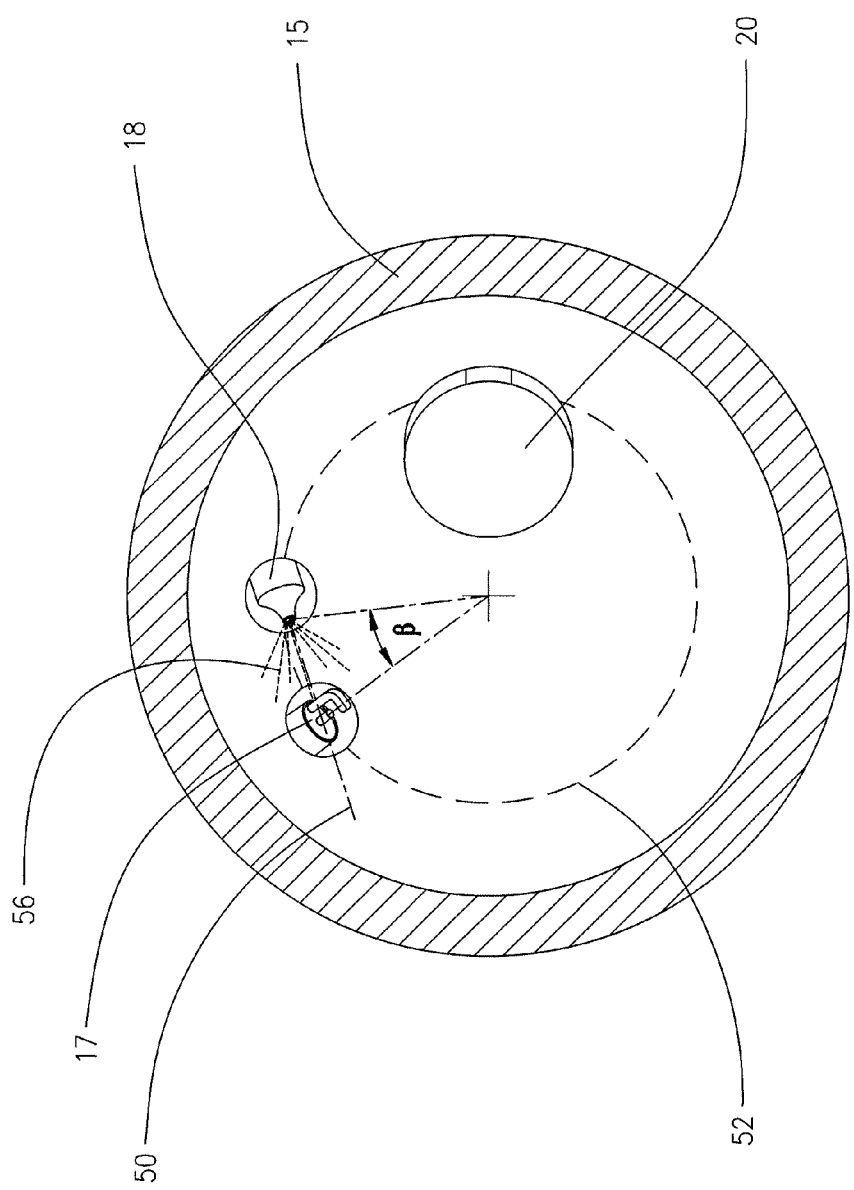
FIG. 6 shows a horizontal sectional view of the head of the cylinder through line 6-6 of FIG. 4.

A spark igniter 17 is positioned directly downstream of the injector (counterclockwise along pathway 52 in FIG. 6) and in the path of the injected fuel 56. The spark ignitor 17 ignites the stratified fuel at or after the injected fuel front arrives, resulting in a short combustion delay time of the rapidly mixing stratified fuel charge. The combustion delay time is the time interval between the ignition of the fuel and the completion of the temperature rise due to complete combustion of the quantity of fuel. The spark igniter 17 is position as near to the discharge point of the injected fuel 56 as possible to minimize the combustion delay. In the illustrated embodiment, the spark igniter 17 is position an arc angle 13 from the discharge point of the injected fuel 56, with arc angle β being about 15° to about 45°. The ignition occurs at a high (rich) concentration of fuel in the swirling air, despite an overall low (lean) fuel:air ratio. This fuel charging, air mixing and ignition enables the use of various kinds of fuel with different fuel volatilities, and permits use of high compression ratios and very lean fuel-air mixtures (low fuel flow) with no detonation or preignition problems. The engine power output is controlled by the fuel flow, which eliminates intake manifold pressure losses caused by airflow control valves, and results in a large improvement in engine efficiency at low power conditions. Also, at low power conditions, the reduced fuel flow, with lower combustion temperatures, results in significant reductions in cylinder heat losses, which improves the engine efficiency.

In conventional IC engines, the fuel is injected into the intake manifold, ahead of the intake valve, to provide a homogeneous, stoicheometric fuel-air ratio of 1:1, which results in high combustion temperatures with high heat losses to the cooling medium and high levels of NOx emissions. Lean burning at the design power output results in a large reduction in heat energy loss and also a large reduction in NOx emissions. The power output of the present engine is controlled by the fuel flow because the engine of the invention can operate at such very low fuel-air ratios. This eliminates the large pressure losses in the intake manifold that occur when the power is controlled by metering the intake airflow.

Figure 16:
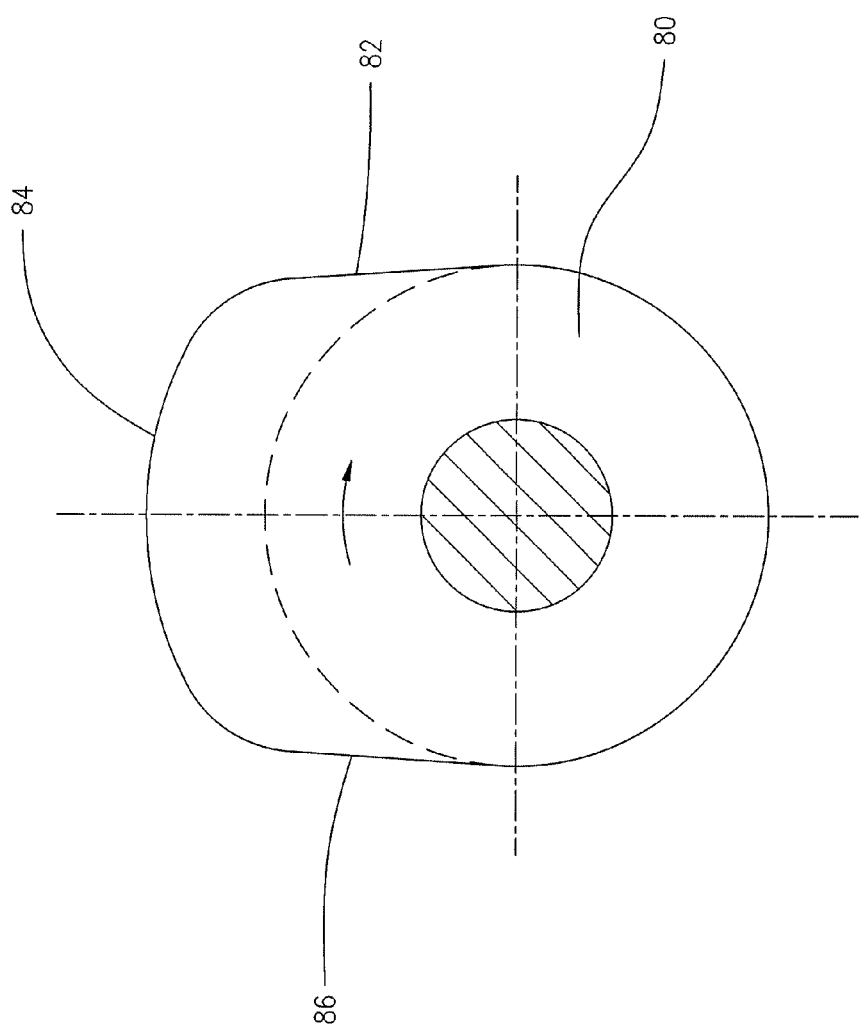
FIG. 16 illustrates a cam of an exhaust port closure mechanism for an engine of the present invention.

An exhaust port closure mechanism is provided to set the opening and closing of the exhaust port by the exhaust valve. The invention also contemplates using one or a plurality of exhaust ports and matching exhaust valves. In one embodiment of the invention, the exhaust port closure mechanism is a camshaft that is mechanically linked to the crankshaft of the engine to open and close the exhaust valve at the appropriate time, and more specifically at fixed closing and opening cycle timing, during the reciprocating stroke of the piston. The exhaust valve can be a conventional poppet valve which opens and closes using conventional camshaft actuation. The mechanical linkage to the crankshaft can be conventional, and linked either directly, via a gear mechanism, or indirectly via a belt or chain called a timing belt or timing chain. The cam is configured to increase the duration of the exhaust port opening. Duration, or dwell, is the number of crankshaft degrees of engine rotation during which the exhaust valve is lifted off the seat of the exhaust port, opening the exhaust port. The camshaft lift is the resultant net rise of the exhaust valve from its seat. FIG. 16 illustrates a cam 80 that can be employed in the exhaust port closure mechanism. The profile of the cam 80 includes a lifting portion 82 that lifts the exhaust valve off the exhaust port seat to its lift position, a dwell portion 84 where the exhaust valve remains (dwells) at the lift with the exhaust port fully open, and a lowering portion 86 that lowers the exhaust valve back to the seat. The duration of the cam is typically about 140° to about 180° of crank angle, more typically about 155° to about 165°, and for example, about 160°. The lifting and lowering portions are each typically and independently about 14° to about 17° of crank angle. The portion of the duration during which the exhaust port is held in an open position after closure of the inlet air port is typically about 50° to about 60°, but can be more or less.

Electromechanical valve control can be used to adjust and control the opening and closing of the exhaust valve more rapidly. Examples of devices for achieving variable opening and/or closing of the exhaust valve are given in U.S. Pat. Nos. 6,257,190, 6,053,134, 5,537,961, 5,103,779, whose disclosures of which are incorporated by reference herein in their entirety. Further, a programmed solenoid can be used to fully open the exhaust valve 20 in each cylinder at cold engine starting conditions which reduces initial cylinder compression pressure.

Other means and methods of opening and closing the exhaust port can be employed as may occur to a person of skill in art, including a solenoid-powered and activated exhaust valve.

A ceramic matrix composite (CMC) can be used to construct the cylinder, including the cylinder walls and the cylinder head, the exhaust valves, and the piston. CMC is a matrix made of a ceramic material embedded between a fibrous material. Typical fibrous materials include carbon, silicon carbide, aluminum oxide and mullite. Aluminum oxide, zirconium oxide and silicon carbide are chiefly used as matrix components. Examples of CMC materials and their use in making components of IC engines are described in U.S. Pat. Nos. 5,888,641 and 5,947,094, the disclosures of which are incorporated by references in their entireties.

The Two Stroke Cycle

The two-stroke full expansion cylinder cycle of the invention includes an air intake phase, a compression stroke, a fuel injection phase, an ignition and combustion phase, a power stroke, and an exhaust and scavenging phase. In the illustrated embodiment of the invention, a complete cycle includes only the two strokes of the piston within the cylinder, and one complete rotation of a crankshaft 35 to which a piston rod joins the piston 9. The invention provides a method of operating the IC engine that includes repeating the cylinder cycle tens to hundreds of time per second.

The Cycle for a Two-Stroke, Uniflow, Full Expansion Cylinder

Figure 15:
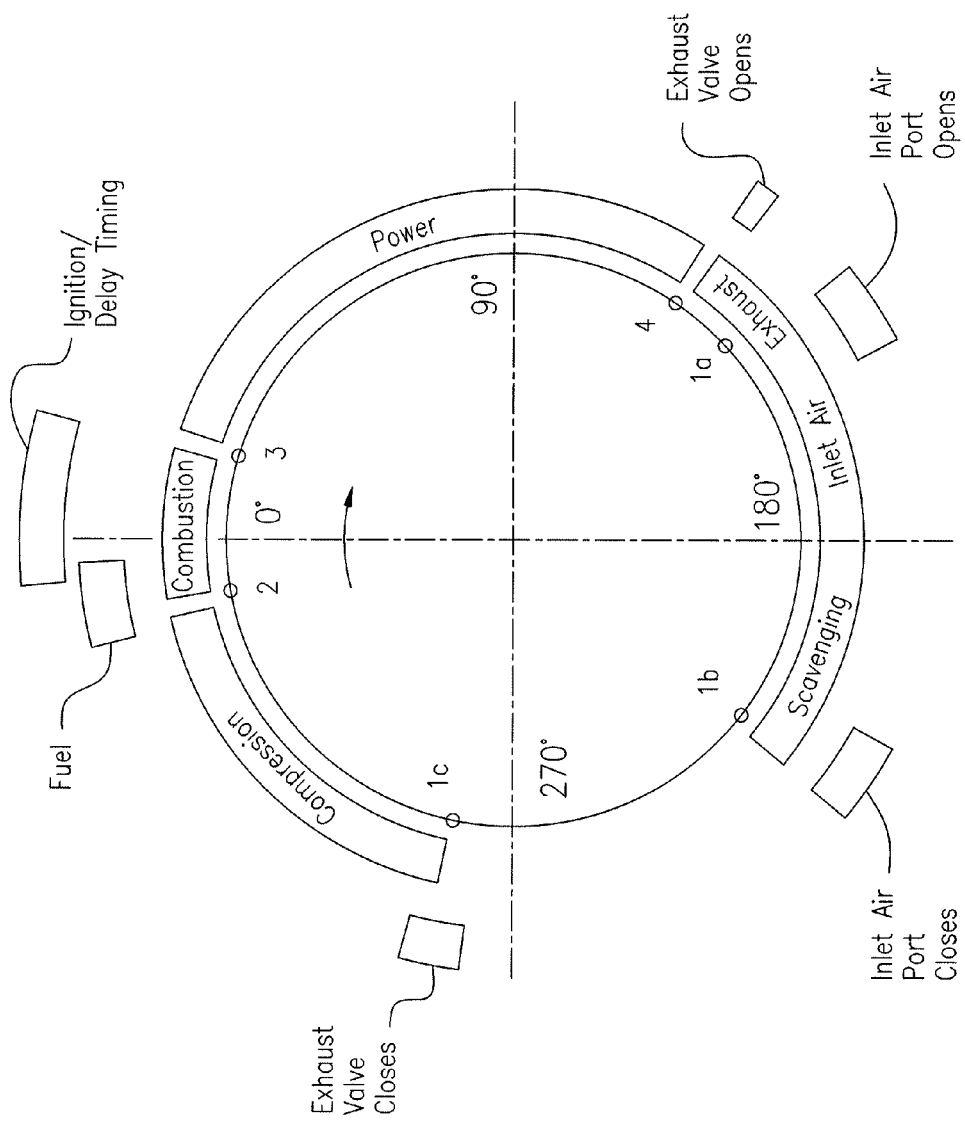
FIG. 15 shows a schematic diagram of the crank angle through the compression, fuel injection ignition, combustion, power, exhaust, and scavenging phases of the cylinder cycle.

FIG. 7 illustrates the thermodynamic operating cycle as a pressure-volume diagram, while FIGS. 8-14 show the crank position of the engine at the operating stages of the cylinder stroke cycle. The vertical scale in FIG. 7 shows the gas pressure inside of the cylinder at the engine operating points, and the horizontal scale shows the open volume inside of the cylinder boundaried by the cylinder wall 15, the cylinder head 16 and the piston 9. FIG. 15 shows a schematic diagram of the crankshaft angle through the phases of the cylinder cycle.

At cycle point 1a of the diagram of FIG. 7, with the piston is at the bottom of the stroke (bottom dead center, BDC, shown in FIG. 8 at the 180° crank angle) and furthest in distance from the cylinder head 16, the exhaust valve is open, and the air intake port is open. Inlet air is swirling into and scavenging the cylinder. The piston then moves upward to point 1b, at which the swirl inlet port becomes covered by the piston and closed (FIG. 9), while the exhaust port remains uncovered and open. The exhaust port remains open from cycle point 1b to point 1c (shown in FIG. 10), which is a considerable portion of the total upward stroke length of the piston, during which air is pushed out of the cylinder by the piston, which further cools the exhaust valve and further results in a very high scavenge efficiency (~99%). The exhaust port is kept or held open for what would normally be the part of the compression stroke. Some of the low pressure compressed inlet air that enters the cylinder through the high velocity swirl port at the bottom of the cylinder goes out of the exhaust port before it closes. A small amount of the compressed air energy is lost when this happens, but the energy gain in the power stroke is much larger, and the cooler scavenging inlet air cools the cylinder walls and the exhaust valve.

Figure 10:
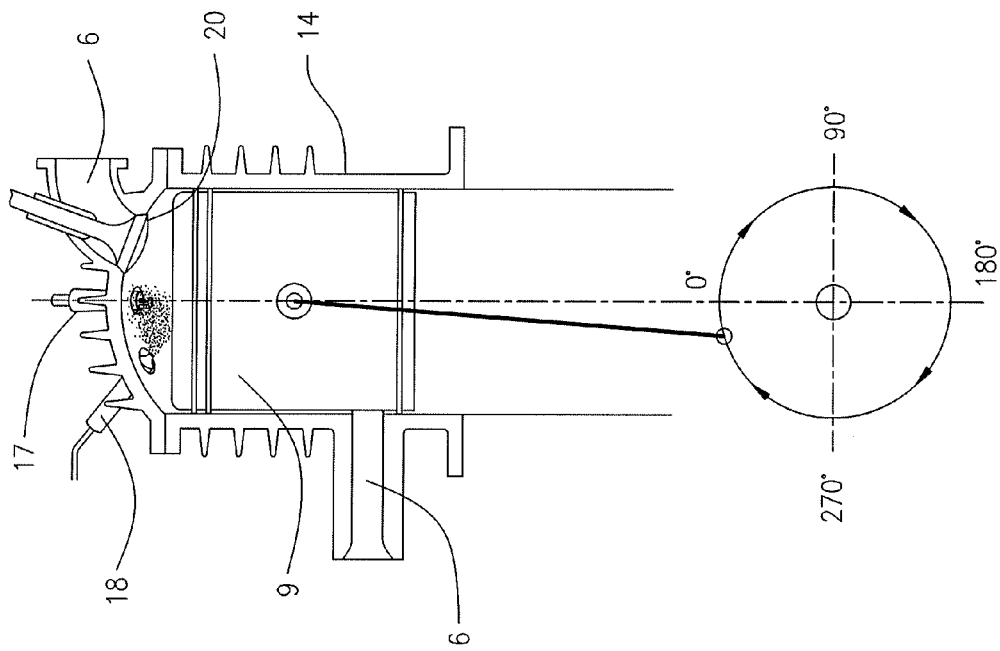
FIG. 10 shows a schematic diagram of the uniflow cylinder showing the crank angle position with the piston approaching halfway through compression stroke movement of the piston, at which point the exhaust port closes and compression commences.
Figure 11:
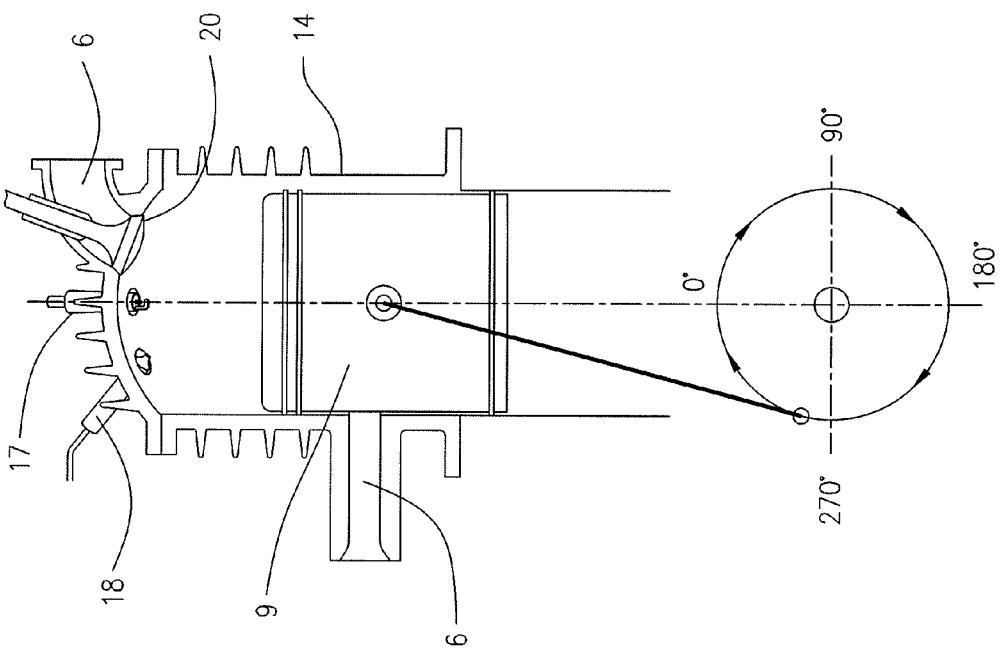
FIG. 11 shows a schematic diagram of the uniflow cylinder showing the crank angle position with the piston approaching the end of the compression stroke, with injection of fuel.
Figure 12:
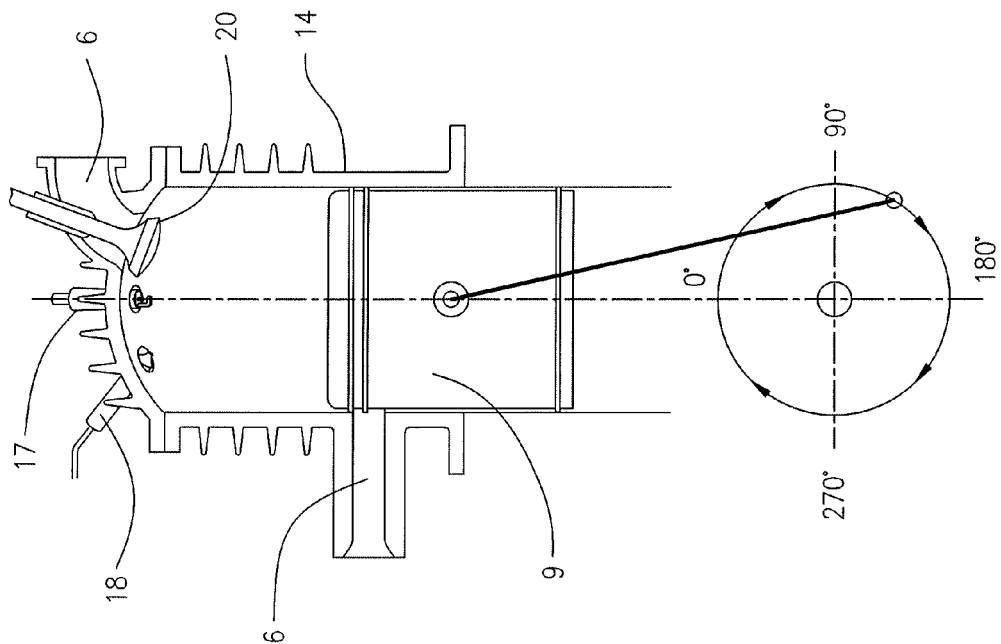
FIG. 12 shows a schematic diagram of the uniflow cylinder showing the crank angle position with the piston approaching top dead center with firing of the spark means and initiation of combustion and the power stroke.
Figure 13:
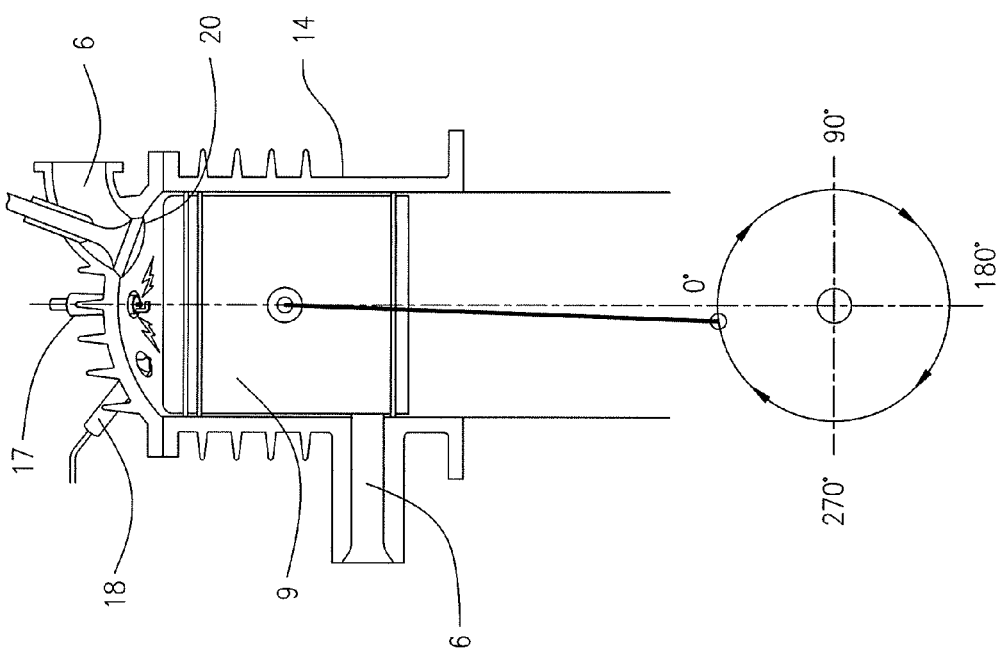
FIG. 13 shows a schematic diagram of the uniflow cylinder showing the crank angle position with the piston approaching full expansion at the end of the power stroke, at which point the exhaust port opens.
Figure 14:
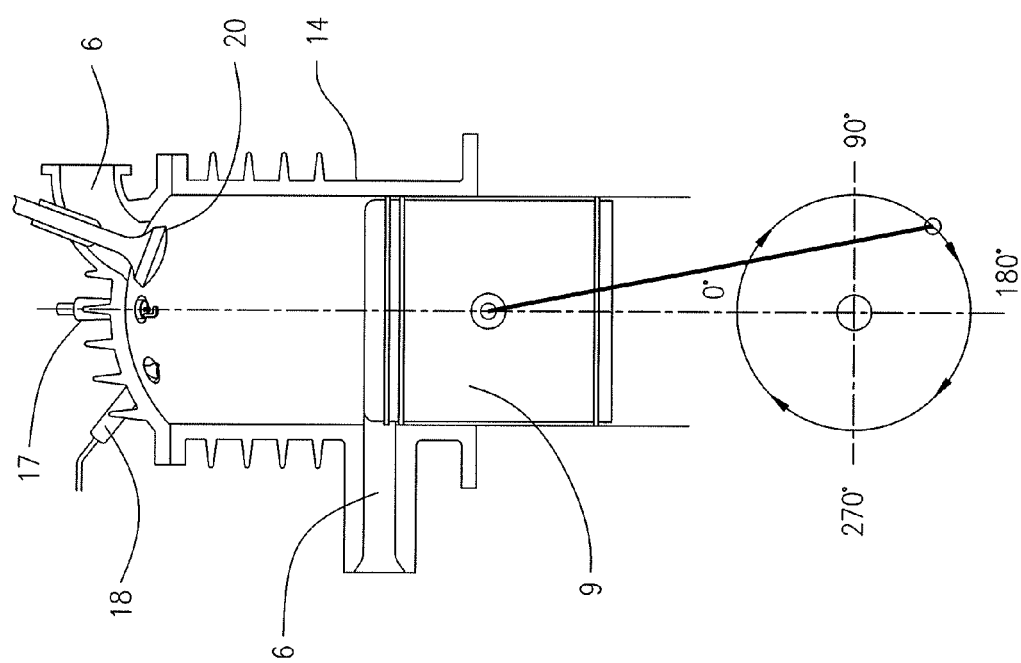
FIG. 14 shows a schematic diagram of the uniflow cylinder showing the crank angle position with the inlet air swirl port opening and exhaust port opened and the start of exhausting the combustion gases.

At point 1c, at about halfway up the compression stroke movement of the piston, the exhaust port closes (FIG. 10). After the exhaust port closes, the air trapped within the cylinder is compressed by the change in cylinder volume from point 1c to point 2, shown in FIG. 11. The compression stroke proceeds between points 1c and 2, and the design value of the engine compression ratio is determined by this change in cylinder volume and the volume at the top of the stroke (top dead center, TDC) between the cylinder head 16 and the top of the piston 9. Near the top of the piston stroke, fuel injection is provided by a high pressure automotive fuel injector with small fuel droplets in a spray pattern that is fuel rich in the center of the spray (FIG. 11). Immediately thereafter, the ignition from spark plug 17 occurs near or at TDC at point 2 (FIG. 12), resulting in combustion of the fuel injected into the combustion chamber near the top of the piston stroke, and in a large and nearly instantaneous increase in pressure from cycle point 2 to cycle point 3a, which occurs at almost constant volume. (Cycle point 3 is the theoretical maximum pressure condition Point 3a represents the actual conditions resulting from combustion delay.) The engine power stroke begins at cycle point 3a, where the peak value of pressure and temperature is determined by the combustion delay time. Higher values of pressure and temperature parameters and a higher engine efficiency are obtained by reductions in combustion delay time. During expansion, from cycle point 3a to cycle point 4, which represents the engine power stroke, the exhaust port remains closed to take full advantage of the high pressure through toward the end of the stroke, which at point 4 is almost down to atmospheric pressure (FIG. 13). This process converts almost all of the available chemical energy in the fuel for the Otto cycle to engine (kinetic) power, which results in a very large improvement in engine efficiency.

When the start-of-compression position is about half the distance of the normal full compression stroke, and the exhaust port opens at the end of the power stroke, just before the piston uncovers the swirl inlet port, the effective length of the power stroke is about twice the effective length of the actual air compression stroke. The combustion gases at the end of the power stroke (FIG. 13, but just before the exhaust port has opened) are almost completely expanded down toward atmospheric pressure, providing very little blow-down loss when the exhaust port does open, and a scavenging efficiency of very close to 100%. With excess air to fuel ratio, and high efficient scavenging, the fuel finds the oxygen quickly and efficiently at the start of combustion. Typically, the start-of-compression position is about half the distance of the normal full compression stroke, between the inlet-seal position and the top-dead-center position, although the start-of-compression position can be about 25%, about 30%, about 35%, about 40%, about 45%, about 55%, about 60%, about 65%, about 70%, and about 75%, of the normal full compression stroke, between the inlet-seal position and the top-dead-center position.

In conventional engines, the exhaust valve opens at the volume indicated by cycle point 4c which, for conventional engine designs, is at the bottom of the piston stroke, and where the exhaust gas pressure and temperature are still high.

Figure 8:
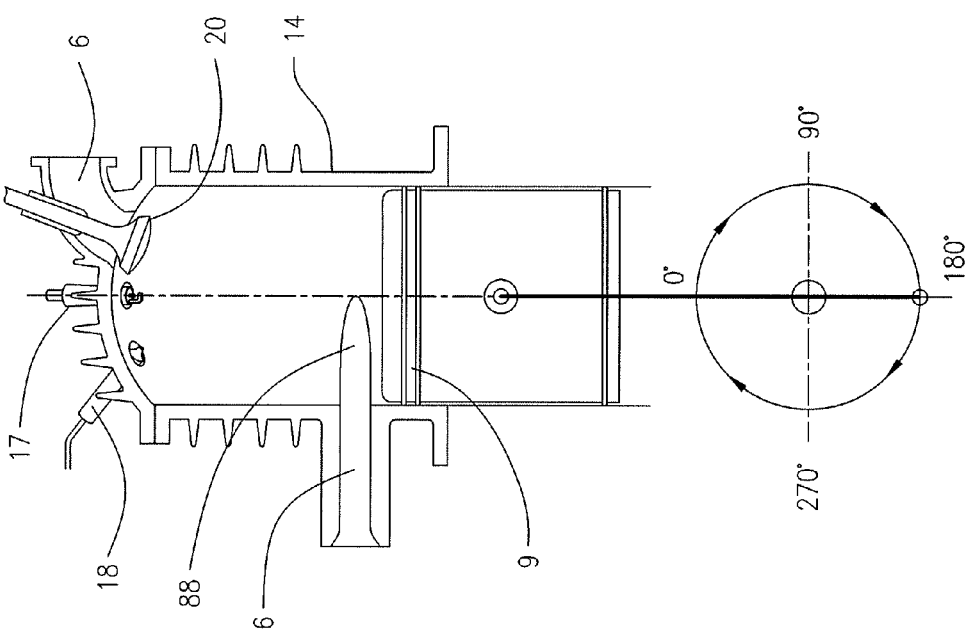
FIG. 8 shows a schematic diagram of the uniflow cylinder showing the crank angle position with the piston at the bottom dead center position of the stroke cycle, with both the swirl inlet air port and the exhaust port opened.

As the cycle continues at point 4 of FIG. 7, the exhaust port opens (FIG. 13) and as the piston 9 continues through the down stroke, the swirl inlet air port becomes uncovered and opened (FIG. 14), initiating exhaustion of the remaining combustion gases and quickly reducing the cylinder pressure to the inlet air pressure, as the cycle returns to point 1a (FIG. 8).

Advantageous Features of the Full Expansion Engine

The present invention provides a uniflow, full expansion two-stroke engine design that has roughly one-half of the cylinder displacement required by a four-stroke engine with the same power output. The power stroke of the engine of the present invention recovers nearly all of the pressure and heat energy that is normally exhausted to the atmosphere. With much lower cooling losses due to lean burning and thermal barrier coatings on the inside of the cylinder head and on the piston crown, this engine retains most of the heat energy (converted to kinetic energy) that is normally lost to the cooling medium, and can be air cooled with a substantially diminished risk of overheating. The smaller two-stroke engine without an elaborate water cooling system is much lighter in weight and less costly to manufacture. The lean burning also reduces combustion temperatures and therefore NOx emissions. The hot surfaces of TBC coatings also reduce hydrocarbon (HC) and carbon monoxide (CO) emissions by burning normally unburned combustion products. With direct injection of the fuel, the engine power output is controlled by the fuel flow rather than by the air flow, which eliminates pressure losses caused by air control valves, venturis, and other restrictions in the intake manifold at all of the power settings.

With all of the advantages and features enumerated above, the two stroke full expansion engine of this invention has a thermodynamic fuel efficiency that is almost double that of a conventional four stroke internal combustion engine, and with a significant reduction in emission of combustion pollutants. Also, with no intake airflow valves and valve mechanisms, and no liquid cooling systems, the two-stroke engine of this invention is much lighter in weight and less costly than conventional engines.

I claim:

1. A method for operating a two-stroke, uniflow, full expansion internal combustion (IC) engine, the method comprising repeating a cylinder cycle, the cycle comprising the steps of:
   a) passing pressurized inlet air through an uncovered swirl inlet port and into a cylinder with a piston proximate the bottom of its reciprocal stroke (BDC) within the cylinder, and swirling the inlet air in tangential turbulent unidirectional flow within the cylinder,
   b) maintaining an exhaust port in an open position while the swirl inlet port is uncovered to provide scavenging of the cylinder by the inlet air,
   c) advancing the piston upward to cover the swirl inlet port at a fixed closing cycle timing,
   d) further maintaining the exhaust port in an open position after covering the swirl inlet port for a substantial portion of the remaining stroke movement of the piston toward top dead center (TDC);
   e) closing the exhaust port at a fixed closing cycle timing,
   f) compressing the inlet air between the piston and the cylinder head as the piston advances toward top dead center at a constant pressure ratio of about 10:1 to about 25:1,
   g) dispersing a fuel near the end of the compression stroke at a lean burning fuel to air ratio of about 0.04:1 to about 1:1, relative to a stoicheometric fuel:air ratio of 1:1,
   h) spark igniting and combusting the air-fuel mixture to initiate the power stroke,
   i) opening the exhaust port near the end of the power stroke at a fixed opening cycle timing to exhaust pressurized combustion gases, and
   j) uncovering the inlet swirl port as the piston approaches the bottom of its power stroke at a fixed opening cycle timing.

2. The method according to claim 1, wherein in step d), the exhaust port is open for a majority of crank cycle between the BDC position to the TDC position.

3. The method according to claim 1 wherein a fuel injector is oriented to inject a fuel in the same tangential direction as the inlet orientation of the swirl inlet port, and wherein the ignition is a spark ignition, and a spark means for the spark ignition of the fuel is disposed downstream of the stream of the fuel injector.

4. The method according to claim 1 wherein the lean burning fuel to air ratio is about 0.2:1 to about 0.8:1, relative to a stoicheometric fuel:air ratio of 1:1.

5. The method according to claim 4 wherein the lean burning fuel to air ratio is about 0.6:1.

6. The method according to claim 1 wherein the constant pressure ratio is about 15:1 to about 20:1.

7. The method according to claim 1, further providing a step of including a thermal barrier coating on an inside of cylinder head to reduce heat loss through the cylinder head.

8. The method according to claim 7 wherein the thermal barrier coating is a ceramic matrix composite (CMC).

9. The method according to claim 1 wherein the steps of dispersing the fuel and spark igniting and combusting the air-fuel mixture employ a stratified charge design.

10. The method according to claim 1 wherein a pressure in the cylinder after opening the exhaust port near the end of the power stroke at a fixed opening cycle timing to exhaust pressurized combustion gases, is approaching atmospheric pressure.

11. The method according to claim 1 wherein the fuel:air ratio and the engine power output are controlled by the fuel flow rather than by the air flow.

* * * * *